J. & E. Spooner.
Paper Box Mach.

N° 91,983. Patented Jun. 29, 1869.

Witnesses:
A. W. Almqvist
O. Hinchman

Inventor:
J. Spooner
E. Spooner
per Munn & Co
Attorneys.

UNITED STATES PATENT OFFICE.

JOSEPH SPOONER AND EBENEZER SPOONER, OF NEW YORK, N. Y.

IMPROVEMENT IN PAPER-BOX MACHINES.

Specification forming part of Letters Patent No. 91,983, dated June 29, 1869.

*To all whom it may concern:*

Be it known that we, JOSEPH SPOONER and EBENEZER SPOONER, of the city, county, and State of New York, have invented a new and Improved Machine for Forming Paper Boxes with flanged ends; and we do hereby declare that the following is a full, clear, and exact description of the same, which will enable others skilled in the art to make and use the same, reference being had to the accompanying drawings, forming part of this specification, in which—

Figure 1:
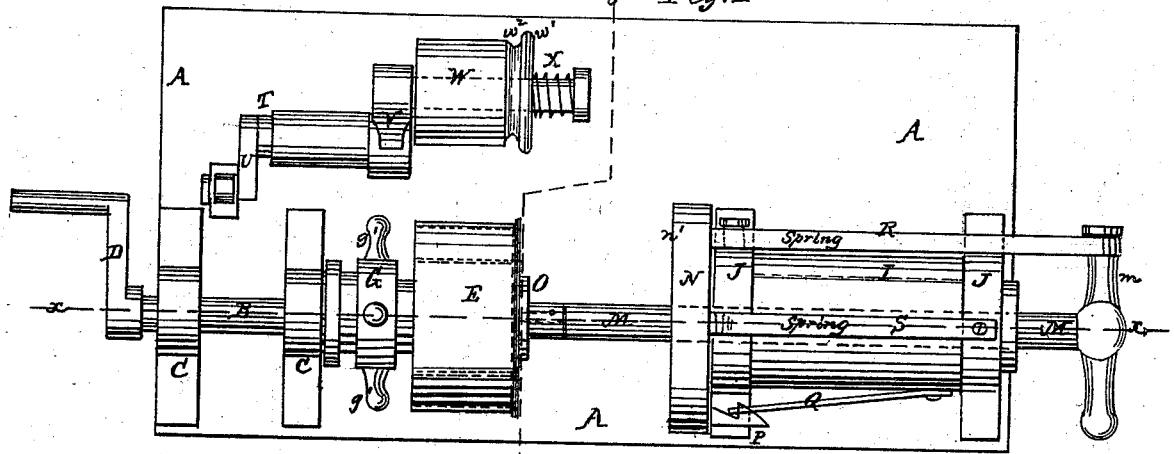
Figure 2:
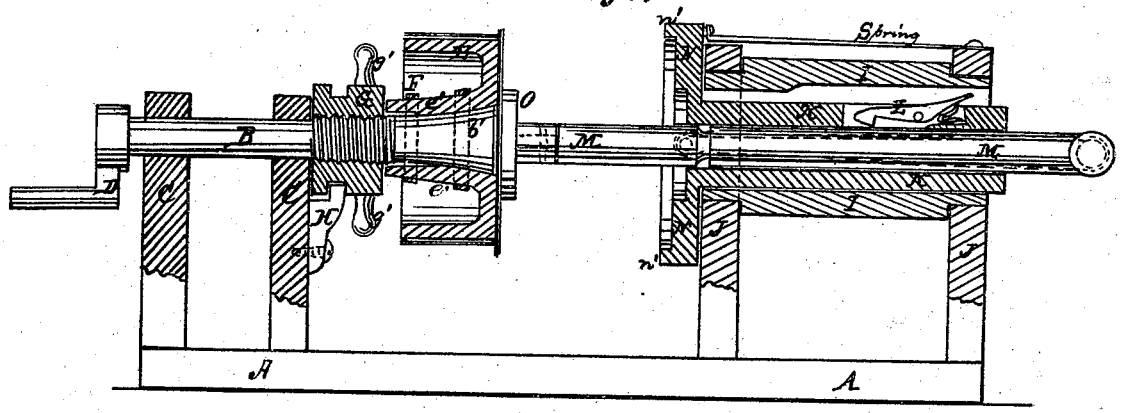
Figure 3:
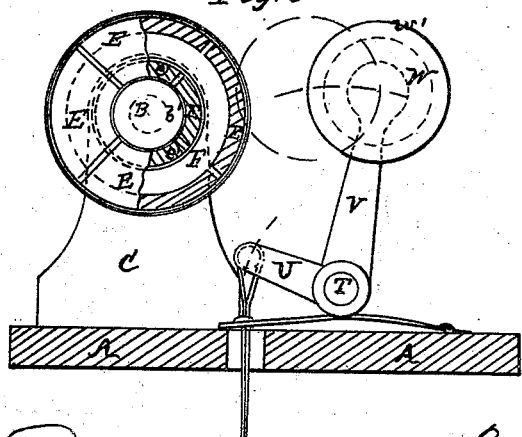

Figure 1 is a top or plan view of our improved machine. Fig. 2 is a vertical longitudinal section of the same, taken through the line $x\,x$, Fig. 1. Fig. 3 is a detail cross-section of the same, taken through the line $y\,y$, Fig. 1.

Similar letters of reference indicate corresponding parts.

Our invention has for its object to furnish an improved machine for forming paper boxes with flanged ends, which shall be simple in construction and effective in operation, enabling the work to be done quickly, conveniently, and neatly; and it consists in the construction and combination of the various parts of the machine, as hereinafter more fully described.

A is the bed-plate of the machine, which is securely attached to a bench, table, or other suitable support. B is a shaft which works in bearings in the standards C, attached to the bed-plate in such a way that the said shaft may also have a longitudinal movement in its bearings. To the outer end of the shaft B is attached a crank, D, and upon its inner end is formed a conical enlargement, $b'$, as shown in Fig. 2.

E is the head, upon which the paper band or tube that forms the body of the box or cover is placed to receive the end piece. The head E is made in parts, as shown in Fig. 3, and has a conical-shaped hole formed through its center to correspond with the cone $b'$ of the shaft B, as shown in Fig. 2, so that by moving the shaft B longitudinally the head E may be extended or contracted, according to the size of the boxes to be operated upon. The head E is hollowed out upon its rear side to form a sleeve, $e'$, to receive the rubber or other spring rings F, by the elasticity of which the said expanding-head E is always held close to the cone $b'$, and yet allowed to expand as the said cone $b'$ is drawn through. The outer end of the head E rests against the under side of the nut G, the outer side of which rests against the standard C, so that the expanding-head may be fully supported when being used.

The nut G works upon a screw-thread formed upon the part of the shaft B that passes through it, is always held close up against the standard C by the bracket or jaw H attached to said standard, and which enters a groove in said nut, as shown in Fig. 2, and is provided with radial arms $g'$ for convenience in holding or operating it, so that by turning the nut G, or by holding the said nut stationary and operating the crank D, the shaft B may be moved longitudinally to expand or contract the head E.

I is a sleeve or hollow cylinder, securely attached to the standards J, which are secured to the bed-plate A. K is a sleeve or hollow cylinder, which passes through and fits into the interior of the stationary sleeve I. In a slot in the sleeve K is pivoted a lever-catch, L, upon the forward end of which is formed a hook, head, or shoulder, to catch in a notch or groove in the shaft M, which passes through and fits into the sleeve K, and is so formed as to enter a groove in the inner surface of the stationary sleeve I.

The spring lever-catch L may be operated to disconnect the sleeve K and shaft M by the rear end of said lever-catch striking against the end of the groove in the stationary sleeve I, or by striking against an adjustable stop passing through the said sleeve I.

N is a circular plate or disk, formed upon or attached to the forward end of the sleeve K, around the edge of which is formed a forwardly-projecting flange, $n'$, as shown in Fig. 2. In the central part of the forward side of the circular-flanged plate N is formed a recess of such a size and depth as to receive the small circular plate O, swiveled to the forward end of the shaft M, so that when the said shaft is drawn back the outer surface of the plates N and O may be flush with each other. The sleeve K and shaft M, when drawn back, are held in place by the catch P, attached to the plate N, catching upon the spring Q attached to the stationary sleeve I or standard J. The sleeve K and shaft M are drawn forward when released from the spring-catch P Q by a rubber or equivalent spring or springs, R, attached to the outer end of the stationary sleeve I or standard J. The sleeve K is drawn back when released from the shaft M by the tripping of the spring lever-catch L by the rubber or equivalent spring S, attached to the plate N and to the stationary sleeve I or standard J.

T is a short shaft working in bearings attached to the bed-plate A, and to the outer end of which is rigidly attached a short crank, U, which should be connected with a treadle, for convenience in operating it. To the other end of the shaft T is attached a longer crank, V, to the crank-pin of which is pivoted a roller, W, which has a flange, $w^1$, formed around its forward end, the side of which flange that is toward the body of the roller should be beveled off or made slightly inclined. In the body of the roller W, at the base of the flange $w^1$, is formed a groove, $w^2$, of a depth equal to the projection of the flanges of the paper boxes to be made. The roller W is held back upon the crank-pin upon which it works by a coiled spring, X, placed upon the end of the said crank-pin, so as to hold the flange $w^1$ close up against the end of the box being made.

In using the machine, the shaft M is drawn back so as to be caught and held by the lever spring-catch L. The head E is then adjusted to the proper size, and the paper box is slipped upon it. The bottom of the paper box is then placed upon the flanged disk N, where it may be held by points attached to the face of said disk N or plate O. The spring-catch P Q is then disengaged, and the shaft M and sleeve K are carried forward by the elasticity of the spring R. As the plates N and O strike against the forward end of the expanding-head E, the spring lever-catch L is disengaged, allowing the sleeve K to be drawn back by the elasticity of the spring S, leaving the bottom of the paper box to be held against the end of the head E by the swiveled plate O. The roller W is then moved forward to rest against the body of the box, the projecting edge of the said box entering the groove of the said roller. The expanding-head E is then revolved by means of the crank D with one hand, while the covering-strip or paper is fed on by the other, the roller W pressing it down upon the body of the box, and the flange $w^1$ pressing it down over the edge and against the side of the flanged bottom of said box.

When the operation is completed, the shaft M is drawn back and the formed box removed. The machine is then ready for forming another box.

It should be observed that a spring or weight should be connected with the shaft or crank of the roller W, to withdraw said roller from the expanding-head E when the treadle is released from the foot of the operator.

Having thus described our invention, what we claim as new, and desire to secure by Letters Patent, is—

1. The expanding-head E, in combination with the cone $b'$, when used in connection with the operating mechanism of a paper-box machine, substantially as herein shown and described, and for the purpose set forth.

2. The combination of the expanding-head E, cone $b'$, shaft B, and hand-nuts G with each other, substantially as herein shown and described, and for the purpose set forth.

3. The combination of the shaft M, sleeve K, lever spring-catch L, and plates N and O with each other, substantially as herein shown and described, and for the purpose set forth.

4. The combination of the shaft M, sleeve K, spring lever-catch L, plates N and O, springs R and S, and spring-catch P Q with each other, substantially as herein shown and described, and for the purpose set forth.

5. The combination of the expanding head E, cone $b'$, shaft B, hand-nut G, plates N and O, shaft M, sleeve K, lever spring-catch L, springs R S, and spring-catch P Q with each other, substantially as herein shown and described, and for the purpose set forth.

The above specification of our invention signed by us this 7th day of April, 1869.

J. SPOONER.
E. SPOONER.

Witnesses:
FRANK BLOCKLEY,
JAMES T. GRAHAM.